US012570163B2

(12) United States Patent
Park et al.

(10) Patent No.: US 12,570,163 B2
(45) Date of Patent: Mar. 10, 2026

(54) METHOD AND SYSTEM FOR COLLOCATED GASOLINE PUMPS AND CHARGING STATIONS FOR ULTRA-HIGH SPEED CHARGING

(71) Applicant: Enevate Corporation, Irvine, CA (US)

(72) Inventors: Benjamin Park, Mission Viejo, CA (US); Fred Bonhomme, Lake Forest, CA (US)

(73) Assignee: Enevate Corporation, Irvine, CA (US)

( * ) Notice: Subject to any disclaimer, the term of this patent is extended or adjusted under 35 U.S.C. 154(b) by 370 days.

(21) Appl. No.: 16/582,602

(22) Filed: Sep. 25, 2019

(65) Prior Publication Data

US 2021/0086637 A1 Mar. 25, 2021

(51) Int. Cl.
  *B60L 53/10* (2019.01)
  *B60L 53/30* (2019.01)
  (Continued)

(52) U.S. Cl.
  CPC .............. *B60L 53/11* (2019.02); *B60L 53/30* (2019.02); *B60L 53/50* (2019.02); *B60L 53/60* (2019.02);
  (Continued)

(58) Field of Classification Search
  CPC .......... B60L 53/30; B60L 53/50; B60L 53/60; B60L 53/11; B60L 58/12; H02J 7/00047; Y02T 10/40; Y02T 90/12; Y02T 90/14
  See application file for complete search history.

(56) References Cited

U.S. PATENT DOCUMENTS 6,456,042 B1    9/2002  Kwok
2007/0075682 A1*  4/2007  Guang .............. H02J 7/007182
                                          320/128

(Continued)

FOREIGN PATENT DOCUMENTS

EP        2815913        12/2014

OTHER PUBLICATIONS

Notification of Transmittal of the International Search Report and the Written Opinion of the International Searching Authority, or the Declaration, Mailed Feb. 22, 2021, For International Application No. PCT/US2020/051366, International Filing Date Sep. 18, 2020.

*Primary Examiner* — Julian D Huffman
*Assistant Examiner* — Johali A Torres Ruiz
(74) *Attorney, Agent, or Firm* — McAndrews, Held & Malloy, Ltd.

(57) ABSTRACT

Systems and methods for collocated gasoline pumps and electric vehicle charging stations for ultra-high speed charging may include a fuel station having fuel pumps, electric vehicle supply equipment, and a charge buffer. The charge buffer may receive electric current from an electricity supply grid and supply current to the electric vehicle supply equipment. The electric vehicle supply equipment may charge batteries at a rate greater than 4 C, 5.6 C, or 10 C. The electric vehicle supply equipment may be configured to charge batteries with silicon-dominant anodes including active material of 50% or more silicon. The charge buffer may be located in an underground former fuel tank. The electric vehicle supply equipment may supply greater than 120 kW. The charge buffer may include an array of capacitors and/or an array of batteries. The electric vehicle supply equipment may be configured to apply a voltage to batteries above their battery voltage limit when charging.

17 Claims, 8 Drawing Sheets

(51) Int. Cl.
   *B60L 53/50*    (2019.01)
   *B60L 53/60*    (2019.01)
   *B60L 58/12*    (2019.01)
   *H02J 7/00*    (2006.01)

(52) U.S. Cl.
   CPC .......... *B60L 58/12* (2019.02); *H02J 7/00047*
   (2020.01); *Y02T 10/70* (2013.01); *Y02T 90/12*
   (2013.01); *Y02T 90/14* (2013.01)

(56)                      References Cited

U.S. PATENT DOCUMENTS

| | | | |
|---|---|---|---|
| 2009/0212626 A1* | 8/2009 | Snyder .................. | B60L 15/209 |
| | | | 903/930 |
| 2011/0291616 A1 | 12/2011 | Kim et al. | |
| 2012/0129049 A1 | 5/2012 | Rayner | |
| 2016/0020618 A1* | 1/2016 | Yang ......................... | H02J 7/04 |
| | | | 320/162 |
| 2016/0298589 A1* | 10/2016 | Setterberg ............. | H02J 7/1423 |
| 2017/0117593 A1* | 4/2017 | Startchik ................. | B60L 53/80 |
| 2017/0155253 A1* | 6/2017 | Veda ....................... | H02J 3/008 |
| 2017/0200943 A1* | 7/2017 | Kawakami ............. | H01G 11/40 |
| 2018/0297477 A1* | 10/2018 | Stanfield ............... | H02J 7/0013 |
| 2020/0376972 A1* | 12/2020 | Martin .................. | H01M 10/44 |

\* cited by examiner

METHOD AND SYSTEM FOR COLLOCATED GASOLINE PUMPS AND CHARGING STATIONS FOR ULTRA-HIGH SPEED CHARGING

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for collocated gasoline pumps and electric vehicle charging stations for ultra-high speed charging.

BACKGROUND

Conventional approaches for electric vehicle charging may be costly, cumbersome, and/or inefficient—e.g., they may be complex and/or time consuming to implement, and may limit electric vehicle market penetration.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for collocated gasoline pumps and electric vehicle charging stations for ultra-high speed charging, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
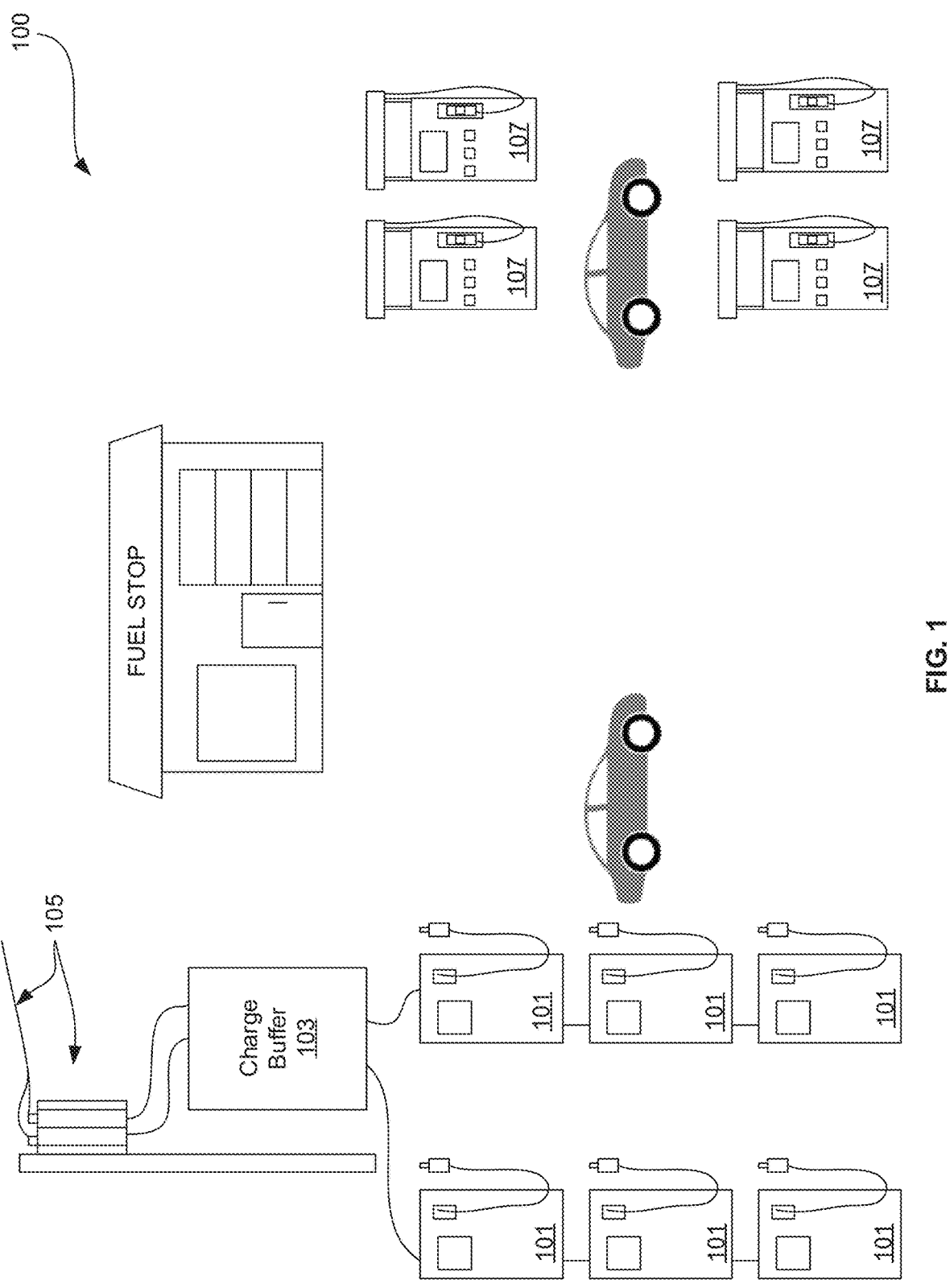
FIG. 1 is a diagram illustrating an automotive fueling station configured to provide fuel for internal combustion automobiles and ultra-fast charging of electric vehicles, in accordance with an example embodiment of the disclosure.

FIG. 1 is a diagram illustrating an automotive fueling station configured to provide fuel for internal combustion automobiles and ultra-fast charging of electric vehicles, in accordance with an example embodiment of the disclosure. Referring to FIG. 1, there is shown a fuel station 100 comprising electric vehicle supply equipment (EVSE) 101, a charge buffer 103, electrical power grid 105, and gas pumps 107.

With the introduction of silicon-dominant ultra-fast charging batteries, described below, existing fuel stations may integrate fast-charging stations in addition to existing fossil fuel pumps, with similar or better convenience than existing fuel pumps. Petroleum companies have networks of stations worldwide that lend themselves to facilities modifications that easily integrate this existing infrastructure to the rapidly growing electric vehicle market. FIG. 1 illustrates such a converted fuel station The EVSE 101 may comprise one or more charging stations with coupling cables and charging plugs for coupling to a charging port of electric vehicles. Depending on the configuration, EVSE 101 may supply just the electrical connection to a charging circuit on the vehicle. In some configurations, the charger is implemented outside the vehicle inside the EVSE 101. The EVSE 101 may comprise electrical components and circuitry, such as transformers, rectifiers, controllers, relays, capacitors, etc., for providing a desired current and voltage to an electric vehicle. The EVSE 101 may comprise a display and control screen where users may select amount of charge to be provided and also provide payment information, for example. In addition credit card readers and/or near field communication (NFC) circuitry may be integrated for payment purposes. Cryptocurrency or other online forms of payment may be accepted and the EVSE 101 may comprise connection to the Internet to provide payment and payment validation through standard or proprietary Internet protocols including block-chain ledger keeping and block-chain payment validation. Faster charging as enabled with ultra-fast charging batteries in accordance with the present disclosure enables services stations to provide charging services to more customers, and thereby they can generate more revenue.

The charge buffer 103 may comprise an array of storage devices, such as batteries or capacitors, that provides a buffer between the EVSE 101 and the electric power grid 105 that provides electrical power to the fuel station 100. The buffering provided by the charge buffer 103 enables the charging system to have large swings in current, such as when multiple vehicles are charging, without taxing the electric power grid 105. The charge buffer 103 may be charged slowly, constantly, periodically or most of the time, but then be operable to provide very high charge rate outputs on-demand, such as for charging ultra-fast charging batteries disclosed herein.

The fuel station 100 may also comprise conventional gas pumps 107 for providing fuel to conventional internal combustion engine vehicles. This integration of ultra-fast chargers at existing fuel stations enables these facilities to switch over gradually to electric charging stations as more car owners switch to electric vehicles. As electric vehicles comprise a larger percentage of cars on the road, EVSE may be added while gas pumps are removed, reducing the economic hardship for gas stations as gas use declines. Furthermore, former buried fuel tanks may be utilized to house some of the charging infrastructure, such as the charge buffer 103, for example, as shown with respect to FIG. 2.

Figure 2:
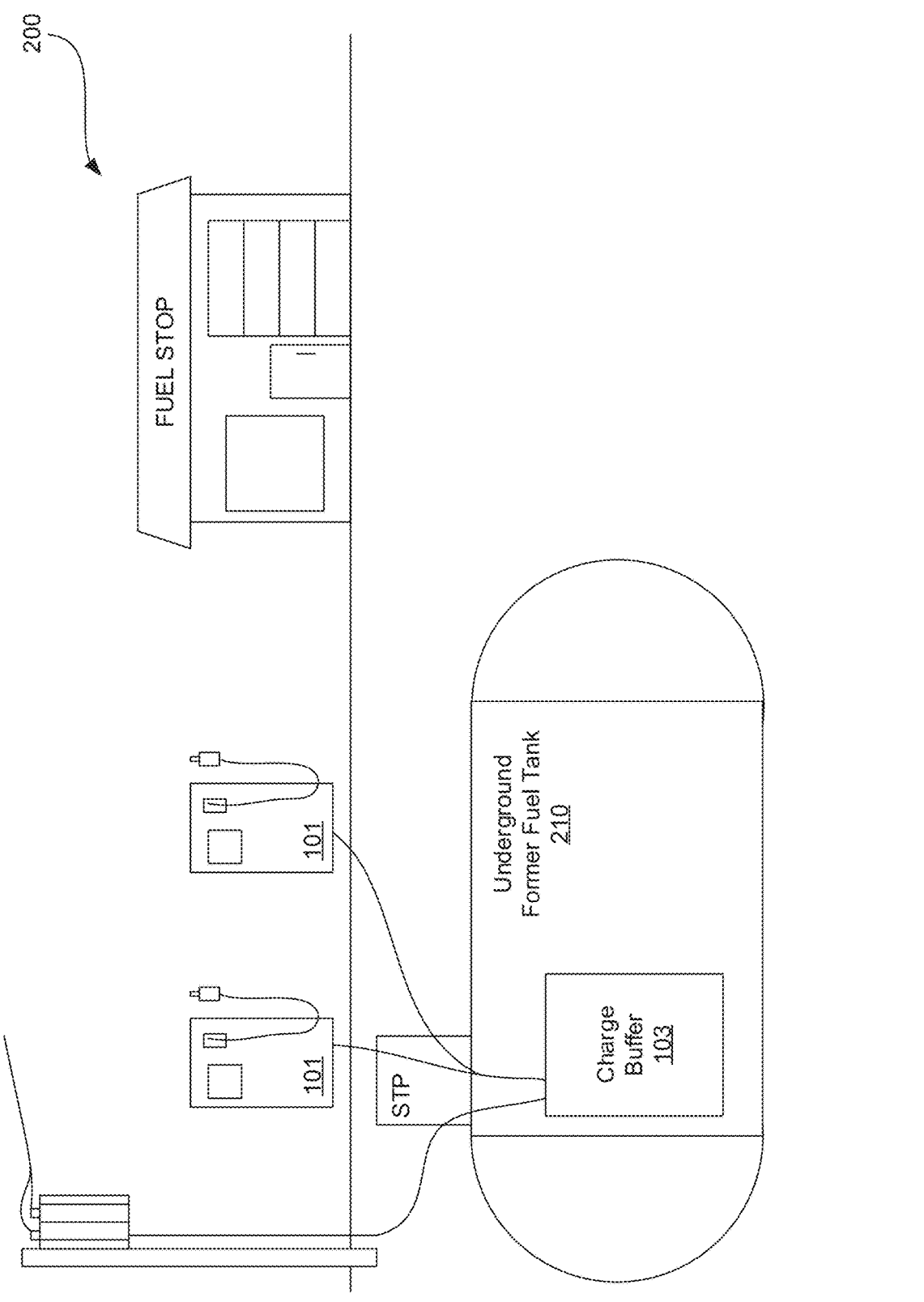
FIG. 2 illustrates a fuel station with ultra-fast charging electric vehicle supply equipment and supporting infrastructure in an underground former fuel storage tank, in accordance with an example embodiment of the disclosure.

FIG. 2 illustrates a fuel station with ultra-fast charging electric vehicle supply equipment and supporting infrastructure in an underground former fuel storage tank, in accordance with an example embodiment of the disclosure. Referring to FIG. 2, there is shown fuel station 200 comprising EVSE 101 and an underground former fuel storage tank 210, within which is charge buffer 103.

As demand for fuel decreases as electric vehicles replace internal combustion engine vehicles, fuel stations will need to adapt or become obsolete. By utilizing existing space and infrastructure, such as underground fuel tanks, and providing battery charging as well as fuel, these fueling stations can more easily transition to the electric vehicle era. The battery and/or capacitors of the charge buffer 103 may be designed in a modular way to be able to be installed piece-wise through a small opening made in the tank. In some cases, the opening may be made where the original Submersible Pumping System (STP) was located.

As described with respect to FIG. 1, the charge buffer 103 may comprise an array of batteries and/or capacitors for storing charge supplied by the electric grid. The electrical interconnects may be fed through the same openings that previously provided fuel to gas pumps above ground. Locating the charge buffer 103 inside underground former fuel storage tanks can conserve valuable real estate on the property, particularly in urban areas with limited space. Furthermore, safety may be improved by keeping the energy storage of the charge buffer 103 away from customers, as provided by the former fuel tank 210.

Figure 3:
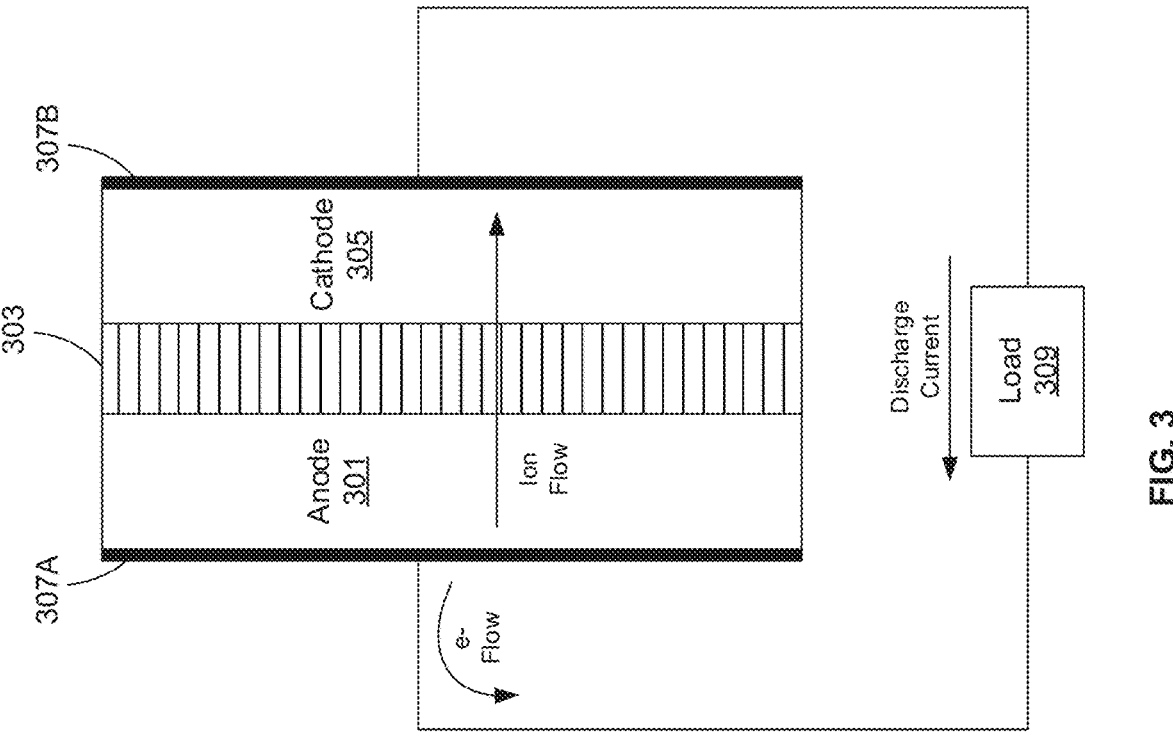
FIG. 3 is a diagram of a lithium ion battery, in accordance with an example embodiment of the disclosure.
Figure 3:
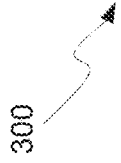

FIG. 3 is a diagram of a lithium ion battery, in accordance with an example embodiment of the disclosure. Referring to FIG. 3, there is shown a battery 300 comprising a separator 303 sandwiched between an anode 301 and a cathode 305, with current collectors 307A and 307B. There is also shown a load 309 coupled to the battery 100 illustrating instances when the battery 300 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 301 and cathode 305, along with the current collectors 307A and 307B may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 301 and cathode are electrically coupled to the current collectors 307A and 307B, which comprise metal or other conductive material for providing electrical contact to the electrodes as well as physical support for the active material in forming electrodes.

The configuration shown in FIG. 3 illustrates the battery 300 in discharge mode, such as when powering a vehicle, whereas in a charging configuration, the load 307 may be replaced with a charger to reverse the process. In an electric vehicle application, the load 309 may comprise drive motors, control electronics, or other electrical systems in the vehicle.

In one class of batteries, the separator 303 is generally a film material, made of an electrically insulating polymer, for example, that prevents electrons from flowing from anode 301 to cathode 305, or vice versa, while being porous enough to allow ions to pass through the separator 303. Typically, the separator 303, cathode 305, and anode 301 materials are individually formed into sheets, films, or active material coated foils. Sheets of the cathode, separator and anode are subsequently stacked or rolled with the separator 303 separating the cathode 305 and anode 301 to form the battery 300. In some embodiments, the separator 303 is a sheet and generally utilizes winding methods and stacking in its manufacture. In these methods, the anodes, cathodes, and current collectors (e.g., electrodes) may comprise films.

In an example scenario, the battery 300 may comprise a solid, liquid, or gel electrolyte. The separator 303 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 303 may be wet or soaked with a liquid or gel electrolyte. In addition, in an example embodiment, the separator 303 does not melt below about 300 to 120° C., and exhibits sufficient mechanical properties for battery applications. A battery, in operation, can experience expansion and contraction of the anode and/or the cathode. In an example embodiment, the separator 303 can expand and contract by at least about 5 to 10% without failing, and may also be flexible.

The separator 303 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 301 and cathode 305 to transfer electrons through the separator 303.

The anode 301 and cathode 305 comprise electrodes for the battery 300, providing electrical connections to the device for transfer of electrical charge in charge and discharge states. The anode 301 may comprise silicon, carbon, or combinations of these materials, for example. Typical anode electrodes comprise a carbon material that include a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon as the portion of the active material, for example. In another example, the anode active material may comprise more than 70% silicon and may comprise self-standing, monolithic, single-particle films without any binder material.

The anode 301 and cathode 305 store the ion used for separation of charge, such as lithium, for example. In this example, the electrolyte carries positively charged lithium ions from the anode 301 to the cathode 305 in discharge mode, as shown in FIG. 3 for example, and vice versa through the separator 305 in charge mode. The movement of the lithium ions creates free electrons in the anode 301 which creates a charge at the positive current collector 307B. The electrical current then flows from the current collector through the load 309 to the negative current collector 307A. The separator 303 blocks the flow of electrons inside the battery 300.

While the battery 300 is discharging and providing an electric current, the anode 301 releases lithium ions to the cathode 305 via the separator 303, generating a flow of electrons from one side to the other via the coupled load 309. When the battery is being charged, the opposite happens where lithium ions are released by the cathode 305 and received by the anode 301.

The materials selected for the anode 301 and cathode 305 are important for the reliability and energy density possible for the battery 300. The energy, power, cost, and safety of current Li-ion batteries need to be improved in order to replace the internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

Current state-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation.

While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In an example scenario, the battery 300 comprises a silicon film anode that is held together by a strong conductive matrix, and does not utilize graphite as an active material, so a lower fraction of the larger amount of silicon, as compared to a silicon graphite anode, can be used during lithiation, resulting in less swelling or expansion of the electrode. In addition, a nano-coating on the electrode material prevents side reactions, so that with the reduced expansion and strong conductive matrix, silicon-dominant anodes do not have cracking issues that silicon graphite anodes have.

Furthermore, as there is little or no graphite in the active material of the anode, as the anode is charged, its voltage decreases as the silicon lithiates, and since the anode only uses silicon for lithiation, and not all of the silicon is lithiated for a full charge, the cell is fully charged when the voltage falls somewhere within the silicon lithiation voltage range, i.e., the voltage does not drop below the lower voltage edge of the silicon lithiation range. As the anode voltage is never as low or below the lower silicon lithiation voltage, lithium plating is essentially eliminated. In addition, since a smaller fraction of the silicon is lithiated, there is reduced swelling.

In silicon-dominant anode cells, a smaller percentage of a larger amount of silicon is lithiated/delithiated during use, as compared to 100% of a smaller amount of silicon in silicon additive graphite cells being lithiated in addition to the graphite lithiation. As a material reaches maximum lithiation, the rate at which the material can take on more lithium decreases, which is why silicon graphite cells must be charged at a much slower rate. Because of the much higher specific capacity of silicon and because only a portion of the silicon needs to be lithiated in silicon-dominant anodes, the lithiation rate can remain high until fully charged, greatly increasing charge rate capability of the cells. For this reason, cells with silicon-dominant anodes, such as battery 303, enable very high charge rates such that service stations can charge an electric vehicle in the time it takes to fill a gas tank.

Figure 4:
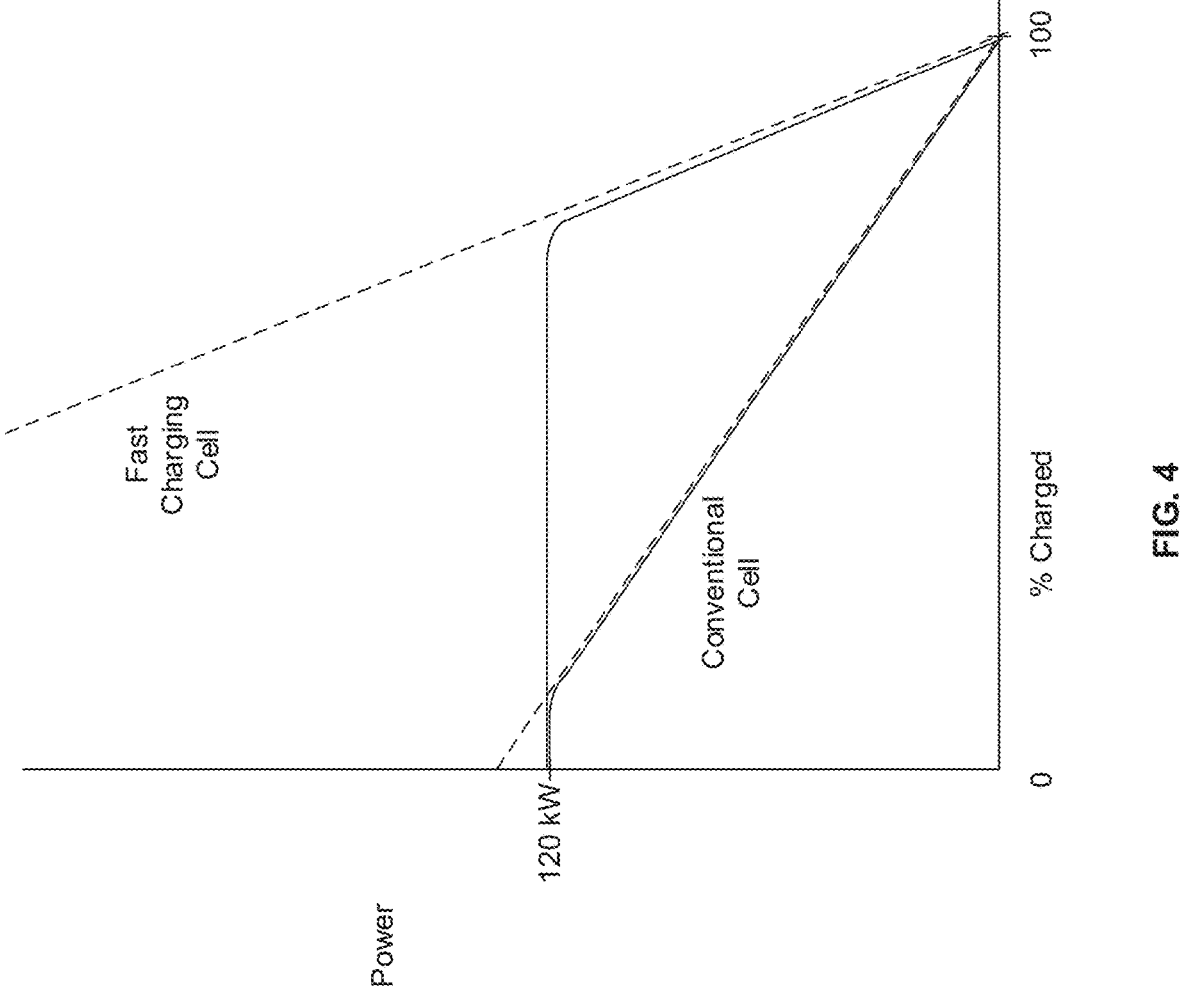
FIG. 4 illustrates the charging of a conventional cell and of an ultra-fast charging cell, in accordance with an example embodiment of the disclosure.

Finally, unlike conventional silicon graphite anode cells, silicon-dominant anode cells can be charged at temperatures below 0° C. (32° F.). If attempted with a silicon graphite cell, although the pack appears to be charging normally, plating of metallic lithium can occur on the anode during a sub-freezing charge, which is permanent and cannot be removed with cycling. Advanced chargers do not attempt to charge cells when the temperature is below freezing, as the lithium plating is dangerous for cell operation FIG. 4 illustrates the charging of a conventional cell and of an ultra-fast charging cell, in accordance with an example embodiment of the disclosure. Current "fast-charging" chargers have the capability to provide power at a high level, such as 120 kW shown in FIG. 4, but due to the charging limitations of conventional cells, are only at that level for a short time before they reduce power so as not to damage the cell. With the much higher charging speeds, 15-20 times faster for example, these same chargers may stay at the increased power level for most of the charge time. Thus, existing charging stations may charge at a much faster rate without requiring higher capacity circuitry because the ultra-high capacity batteries are able to accept the higher charge levels for much longer time.

Due to the capability of ultra-fast charging batteries, as described above, each charging station can be much more efficient. Since each user would only use the station for a shorter amount of time, the revenue of each station would be increased. Also, infrastructure build-out for charging infrastructure for electric vehicles could be done more rapidly as less stations would need to be built.

Figure 5:
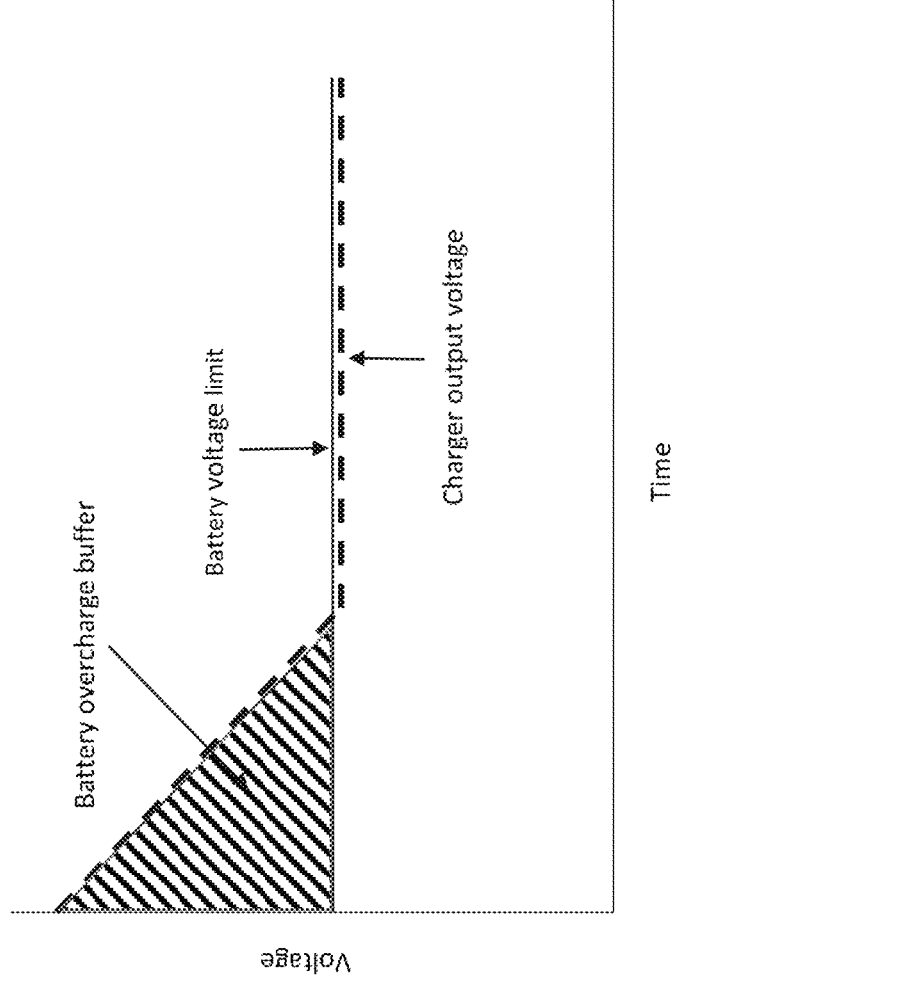
FIG. 5 illustrates cell charge with an overcharge buffer, in accordance with an example embodiment of the disclosure.

FIG. 5 illustrates cell charge with an overcharge buffer, in accordance with an example embodiment of the disclosure. Referring to FIG. 5, there is shown voltage versus time applied on a ultra-fast charge cell with the labeled battery voltage limit.

Because of the tolerance of the ultra-high charge rate silicon-dominant cells to very high charge power and overcharge potential, the charging station can exceed the voltage limit of the battery pack for a short period of time to boost even further the charge time. Therefore, even with a charger power that exceeds the power limit of the battery, the battery can be charged at a faster rate without being damaged.

Figure 6:
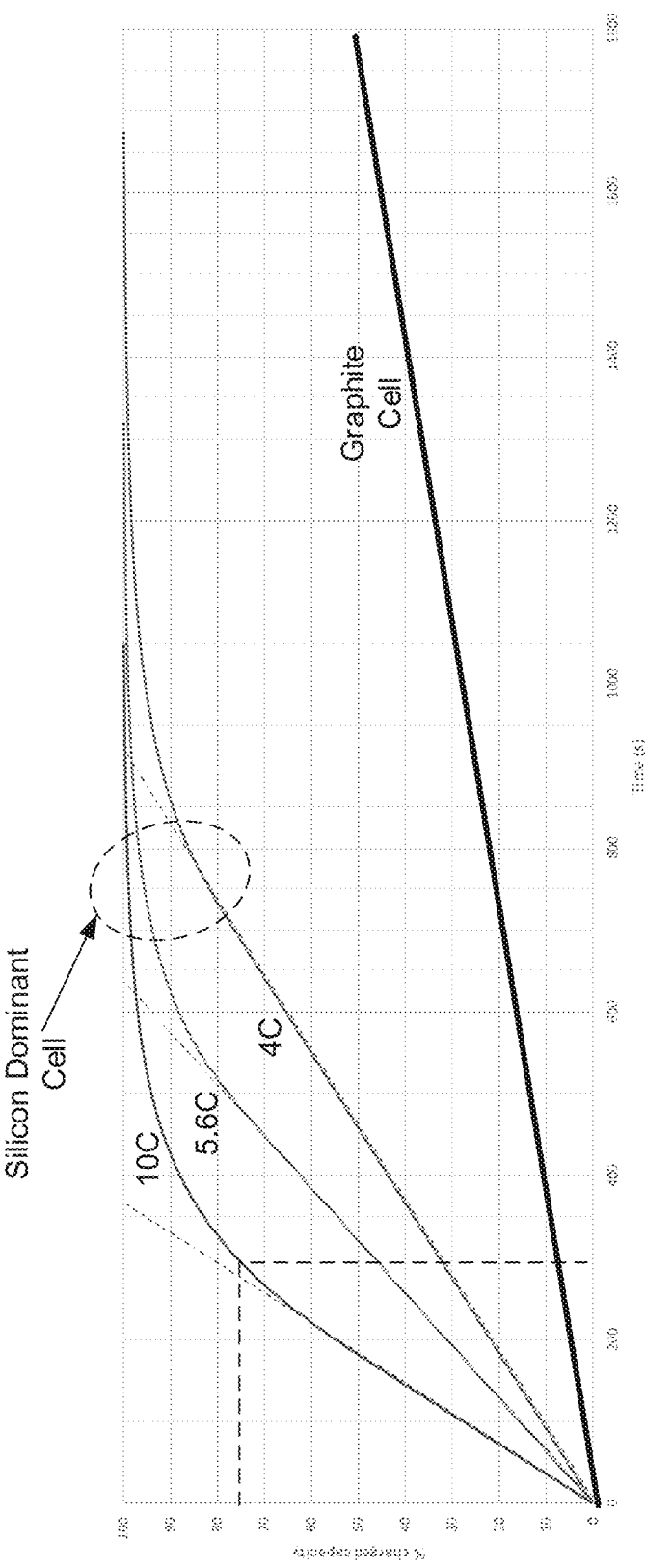
FIG. 6 illustrates charging rates for a graphite cell and a silicon-dominant cell, in accordance with an example embodiment of the disclosure.

FIG. 6 illustrates charging rates for a graphite cell and a silicon-dominant cell, in accordance with an example embodiment of the disclosure. Referring to FIG. 6, there are shown plots of percentage of full charge versus time for graphite with silicon additive anode cell and for a silicon-dominant anode cell at 4 C, 5.6 C, and 10 C. A 1 C charge indicates a 1 A charge current for a 1 A-hour capacity battery. As seen in the plot, the graphite cell is still only 50% charged after 30 minutes, while the silicon-dominant anode cell reaches 75% charge in only 5 minutes when charged at a 10 C rate.

These charge curves illustrate the advantage of silicon-dominant anode cells, where a smaller percentage of a larger amount of silicon is lithiated/delithiated during use, as compared to 100% of a smaller amount of silicon in silicon additive graphite cells being lithiated in addition to the graphite lithiation. As a material reaches maximum lithiation, the rate at which the material can take on more lithium decreases, which is why silicon graphite cells must be charged at a much slower rate. Because of the much higher specific capacity of silicon and because only a portion of the silicon needs to be lithiated in silicon-dominant anodes, the lithiation rate can remain high until fully charged, greatly increasing charge rate capability of the cells. This ultra-high charge capability would enable electric vehicles to be charged in just a few minutes, similar to filling up a tank of gas.

Figure 7:
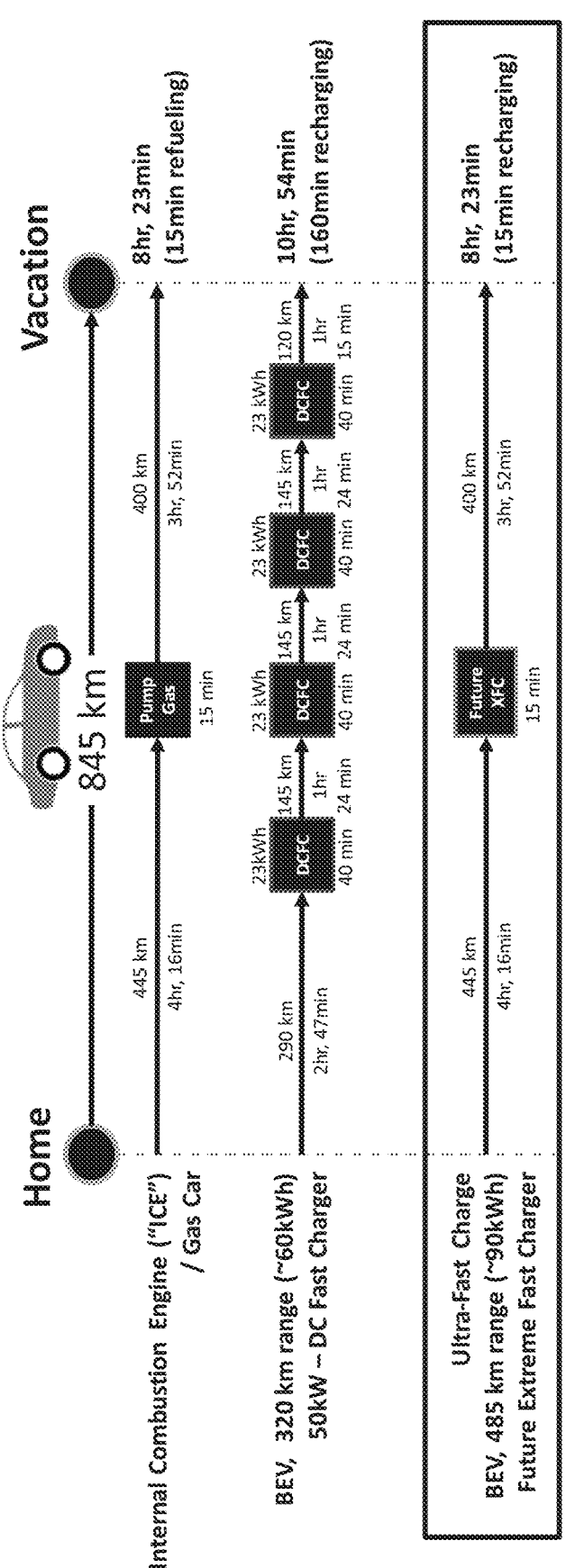
FIG. 7 illustrates travel times for a conventional internal combustion engine vehicle, a conventional electric vehicle, and an electric vehicle with ultra-fast charging silicon-dominant cells, in accordance with an example embodiment of the disclosure.

FIG. 7 illustrates travel times for a conventional internal combustion engine vehicle, a conventional electric vehicle, and an electric vehicle with ultra-fast charging silicon-dominant cells, in accordance with an example embodiment of the disclosure. Referring to FIG. 7, there is shown an example trip with an 845 km (525 miles) travel distance. With a conventional internal combustion engine vehicle, a single tank refill is needed to make the journey, and with the one 15 minute stop, the total time would be 8 hours and 23 minutes. With a conventional electric vehicle with a 320 km range (~60 kWh) and with current 50 kW DC fast chargers available along the trip, four 40 minute charging stops, meaning the entire trip would take nearly 11 hours. This is largely what has limited electric vehicle market penetration—longer trips are far less practical due to the excessive time to recharge the cells.

However, with ultra-fast charge cells that have 485 km range (~90 kWh) and fast charging stations, a single 15 minute charge is needed, making the 845 km trip time to be 8 hours and 23 minutes, the same as the gasoline powered vehicle time.

Figure 8:
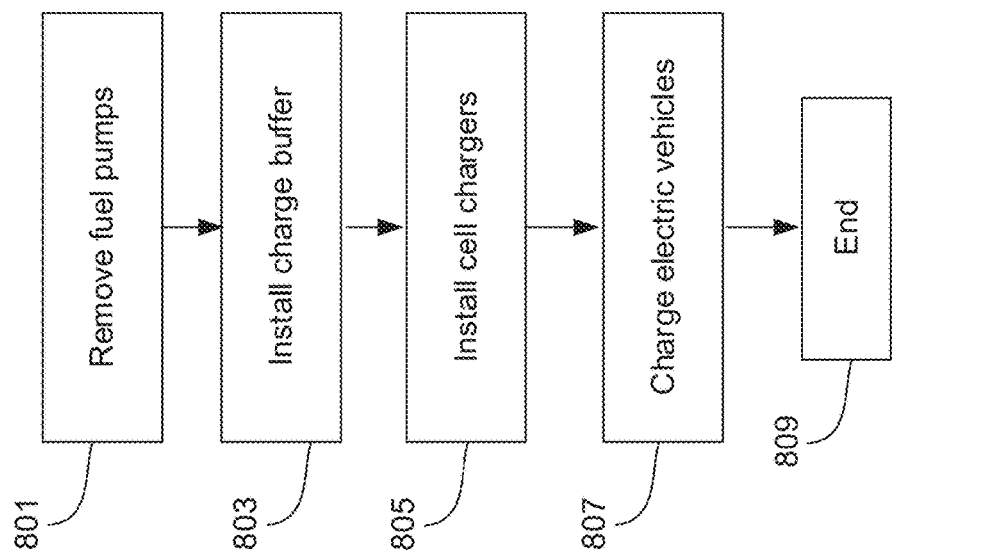
FIG. 8 illustrates a process for conversion of a conventional fuel station, in accordance with an example embodiment of the disclosure.

FIG. 8 illustrates a process for conversion of a conventional fuel station, in accordance with an example embodiment of the disclosure. Referring to FIG. 8, the process begins with step 801 where fuel pumps are removed from the fuel station. In step 803 charge buffers may be installed at the fuel station coupled to the electric grid for providing storage capacity to enable ultra-fast charges of electric vehicles. The charge buffers may comprise arrays of capacitors and/or batteries. In one embodiment, the charge buffers may be installed in underground former fuel tanks. In step 805, charging stations, or EVSE, may be installed and coupled to the charge buffer. The cell chargers may be operable charge ultra-fast charge cells, in step 807, such as silicon-dominant anode cells, that can be charged in less than 10 minutes, thereby providing a recharging process that is as fast as conventional refueling of internal combustion engine vehicles, followed by end step 809.

In an example embodiment of the disclosure, a method and system is described for collocated gasoline pumps and electric vehicle charging stations for ultra-high speed charging, and may comprise a fuel station having fuel pumps, electric vehicle supply equipment, and a charge buffer. The charge buffer is operable to receive electric current from an electricity supply grid and supply current to the electric vehicle supply equipment. The electric vehicle supply equipment may charge batteries at a rate greater than 4 C, greater than 5.6 C, or greater than 10 C. The electric vehicle supply equipment may be configured to charge batteries with silicon-dominant anodes, where the active material of the anode may comprise 50% or more elemental silicon. The charge buffer may be located in an underground former fuel tank. The electric vehicle supply equipment may supply greater than 120 kW. The charge buffer may comprise an array of capacitors and/or an array of batteries. The electric vehicle supply equipment may be configured to apply a voltage to batteries above their battery voltage limit when beginning charging.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. An electric vehicle charging station, the charging station comprising:

fuel pumps, electric vehicle supply equipment operable to provide a variable charging power up to a high charging power level, and a charge buffer operable to receive electric current from an electricity supply grid and supply current to the electric vehicle supply equipment, wherein the electric vehicle supply equipment is configured to:

provide the charging power at the high charging power level to a battery until the battery reaches a first state of charge, and to reduce the charging power below the high charging power level after the first state of charge is reached to avoid damaging the battery, wherein the first state of charge is set or adjusted based on a determination of a type of the battery; and control voltage applied during charging of the battery based on the type of the battery, wherein the controlling comprises, when the type of the battery is a fast charging battery:

applying voltage above a battery voltage limit during a first period that corresponds to an overcharge buffer associated with the type of the battery; and switching to apply the voltage at the battery voltage limit after the first period; and wherein the electric vehicle supply equipment is configured to apply a voltage to batteries above their battery voltage limit when beginning charging.

2. The charging station according to claim 1, wherein the electric vehicle supply equipment charges batteries at a rate greater than 4 C.

3. The charging station according to claim 1, wherein the electric vehicle supply equipment charges batteries at a rate greater than 5.6 C.

4. The charging station according to claim 1, wherein the electric vehicle supply equipment charges batteries at a rate greater than 10 C.

5. The charging station according to claim 1, wherein the electric vehicle supply equipment is configured to charge batteries comprising silicon-dominant anodes comprising active material of 50% or more elemental silicon.

6. The charging station according to claim 1, wherein the charge buffer is located in an underground former fuel tank.

7. The charging station according to claim 1, wherein electric vehicle supply equipment supplies power greater than 120 kW.

8. The charging station according to claim 1, wherein the charge buffer comprises an array of capacitors.

9. The charging station according to claim 1, wherein the charge buffer comprises an array of batteries.

10. A method of charging electric vehicles, the method comprising:

in a charging station comprising fuel pumps, electric vehicle supply equipment operable to provide a variable charging power up to a high charging power level, and a charge buffer:

receiving electric current in the charge buffer from an electricity supply grid;

supplying current to the electric vehicle supply equipment from the charge buffer;

charging one or more batteries in an electric vehicle using the electric vehicle supply equipment, wherein the charging comprises:

providing the charging power at the high charging power level to a battery of the one or more batteries until the battery reaches a first state of charge; and reducing the charging power below the high charging power level after the first state of charge is reached to avoid damaging the battery, wherein the first state of charge is set or adjusted based on a determination of a type of the battery; and controlling voltage applied during charging of the battery based on the type of the battery, wherein the controlling comprises, when the type of the battery is a fast charging battery:

applying voltage above a battery voltage limit during a first period that corresponds to an overcharge buffer associated with the type of the battery; and switching to apply the voltage at the battery voltage limit after the first period; and applying a voltage to batteries above their battery voltage limit when beginning charging using the electric vehicle supply equipment.

11. The method according to claim 10, comprising charging the one or more batteries at a rate greater than 4 C using the electric vehicle supply equipment.

12. The method according to claim 10, comprising charging the one or more batteries at a rate greater than 5.6 C using the electric vehicle supply equipment.

13. The method according to claim 10, comprising charging the one or more batteries at a rate greater than 10 C using the electric vehicle supply equipment.

14. The method according to claim 10, comprising charging batteries with silicon-dominant anodes, where active material of the anodes is 50% or more elemental silicon, using the electric vehicle supply equipment.

15. The method according to claim 10, wherein the charge buffer is located in an underground former fuel tank.

16. The method according to claim 10, wherein electric vehicle supply equipment supplies power greater than 120 kW.

17. The method according to claim 10, wherein the charge buffer comprises an array of capacitors and/or batteries.

* * * * *